(12) United States Patent
Fujii et al.

(10) Patent No.: US 9,709,820 B2
(45) Date of Patent: Jul. 18, 2017

(54) FRESNEL LENS AND OPTICAL DEVICE

(71) Applicants: Essilor International (Compagnie Generale D'Optique), Charenton le Pont (FR); Nikon Corporation, Minato-ku, Tokyo (JP)

(72) Inventors: Toru Fujii, Hiki-gun (JP); Alain Goulet, Ormesson-sur-Marne (FR)

(73) Assignees: Essilor International (Compagnie Generale D'Optique), Charenton Le Pont (FR); Nikon Corporation, Tokyo (JP)

( * ) Notice: Subject to any disclaimer, the term of this patent is extended or adjusted under 35 U.S.C. 154(b) by 55 days.

(21) Appl. No.: 14/725,996

(22) Filed: May 29, 2015

(65) Prior Publication Data

US 2015/0261008 A1    Sep. 17, 2015

Related U.S. Application Data

(63) Continuation of application No. PCT/JP2013/082897, filed on Dec. 2, 2013.

(30) Foreign Application Priority Data

Nov. 30, 2012    (WO) ............... PCT/JP2012/081718

(51) Int. Cl.
*G02C 7/02*    (2006.01)
*G02B 3/08*    (2006.01)

(52) U.S. Cl.
CPC ............. *G02C 7/022* (2013.01); *G02B 3/08* (2013.01); *G02C 7/02* (2013.01); *G02C 2202/20* (2013.01)

(58) Field of Classification Search
CPC .................. G02C 7/02; G02B 1/041
USPC ..................... 359/159.01, 159.73
See application file for complete search history.

(56) References Cited

U.S. PATENT DOCUMENTS

| 4,927,248 | A | 5/1990 | Sakakibara et al. | |
|---|---|---|---|---|
| 6,330,118 | B1* | 12/2001 | Daschner et al. | 359/721 |
| 2006/0001963 | A1 | 1/2006 | Ishikawa | |
| 2006/0082729 | A1* | 4/2006 | To et al. | 351/246 |

FOREIGN PATENT DOCUMENTS

| EP | 0334601 A2 | 9/1989 |
|---|---|---|
| JP | 3310460 B2 | 8/2002 |
| WO | WO 97/01115 A1 | 1/1997 |

(Continued)

OTHER PUBLICATIONS

Office Action issued May 30, 2016, in Chinese Patent Application No. 201380062685.6.

(Continued)

*Primary Examiner* — James Greece
(74) *Attorney, Agent, or Firm* — Shapiro, Gabor and Rosenberger, PLLC

(57) ABSTRACT

A refractive Fresnel lens used for an optical system including an image plane, which includes a plurality of zone lens surfaces disposed concentrically and a plurality of side wall surfaces each formed between adjacent zone lens surfaces, is characterized in that the side wall surfaces are modulated so as to spatially spread in the image plane noise light due to reflection and/or refraction at the side wall surfaces.

17 Claims, 11 Drawing Sheets

100(EMBODIMENT OF THE PRESENT INVENTION)

(56) References Cited

FOREIGN PATENT DOCUMENTS

WO      WO 03/014777 A2     2/2003
WO     WO 2006/034652 A1     4/2006

OTHER PUBLICATIONS

Office Action issued Jun. 23, 2016, in European Patent Application No. EP13818017.9.
International Search Report from International Patent Application No. PCT/JP2013/082897, Feb. 26, 2014.

* cited by examiner

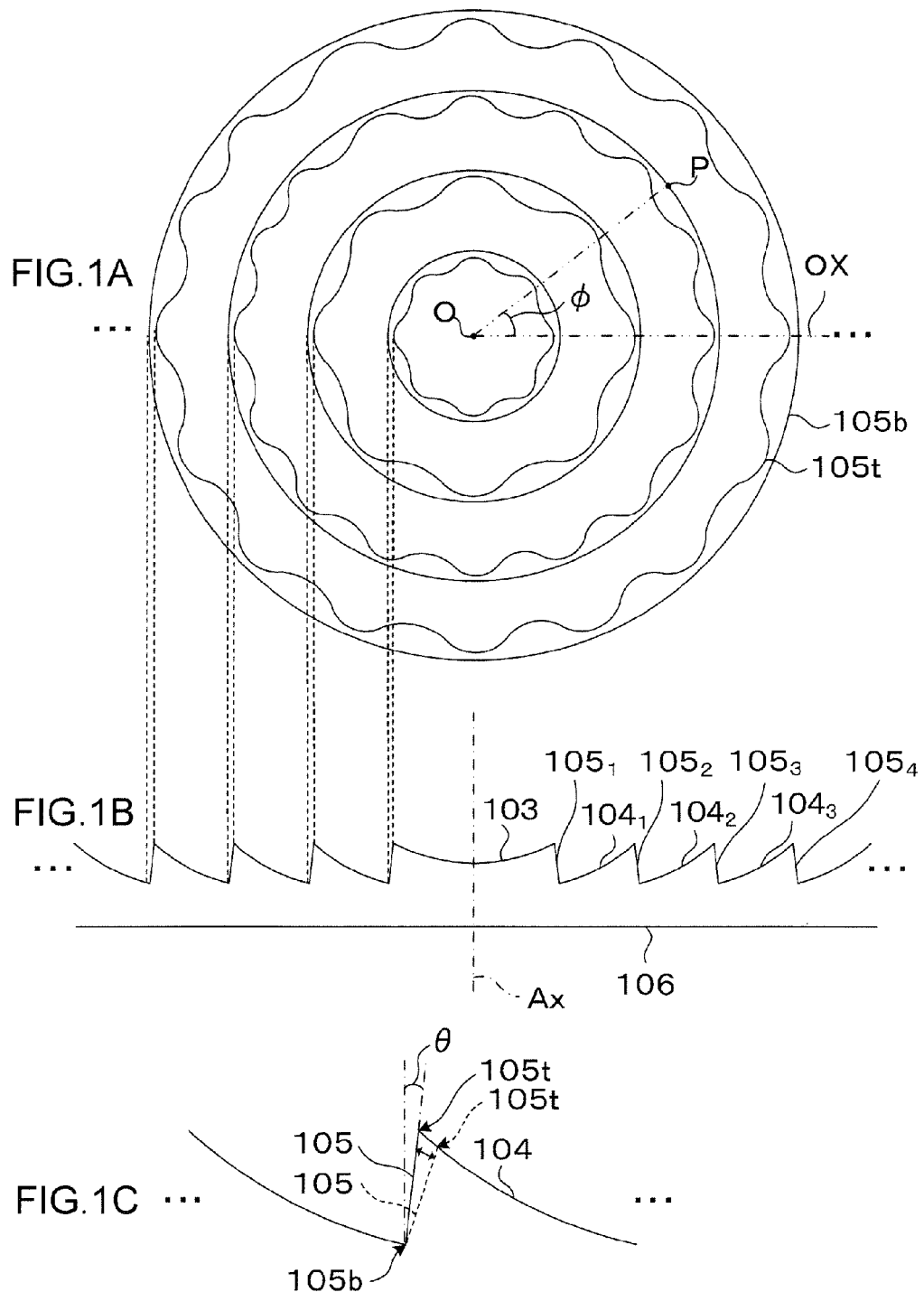

200 (VARIATION 1)

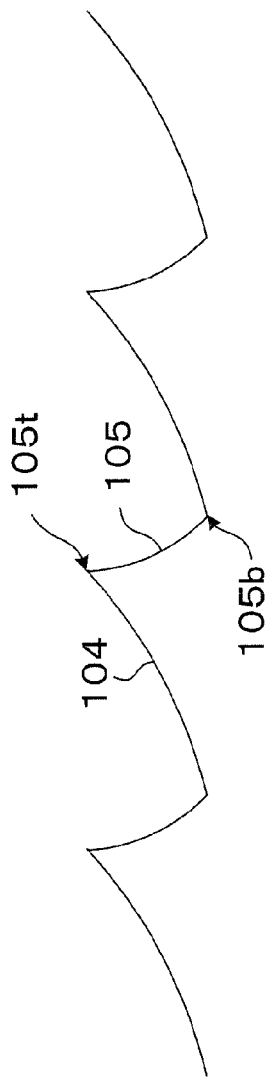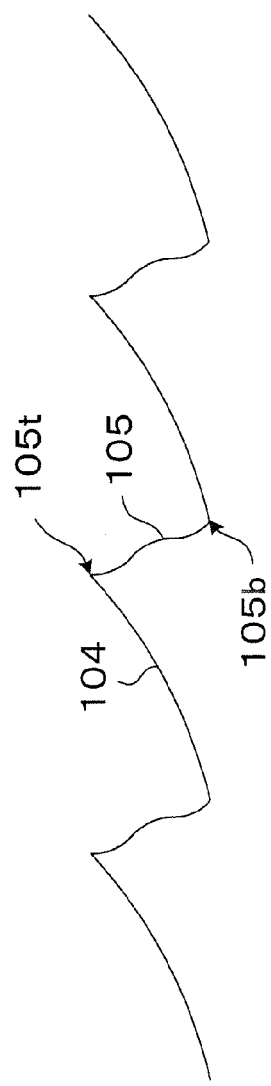

FRESNEL LENS AND OPTICAL DEVICE

This application is a continuation of International Application No. PCT/JP2013/082897 filed Dec. 2, 2013, which claims priority from International Application No. PCT/JP2012/081718 filed Nov. 30, 2012.

INCORPORATION BY REFERENCE

The disclosures of the following priority application and parent application are herein incorporated by reference:

International Application No. PCT/JP2012/081718 filed Nov. 30, 2012

International Application No. PCT/JP2013/082897 filed Dec. 2, 2013.

BACKGROUND OF THE INVENTION

1. Field of the Invention

The present invention relates to a Fresnel lens and an optical device.

2. Description of Related Art

A Fresnel lens known in the related art includes a plurality of zone lenses disposed in a concentric pattern (see Japanese Patent Gazette No. 3310460).

SUMMARY OF THE INVENTION

There is an issue with regard to the Fresnel lens known in the related art in that light reflected and/or refracted at a side wall surface formed between adjacent zone lens surfaces becomes conspicuous noise.

According to the first aspect of the present invention, a refractive Fresnel lens used for an optical system including an image plane, that includes: a plurality of zone lens surfaces disposed concentrically; and a plurality of side wall surfaces each formed between adjacent zone lens surfaces, wherein: the side wall surfaces are modulated so as to spatially spread in the image plane noise light due to reflection and/or refraction at side wall surfaces.

According to the second aspect of the present invention, in the Fresnel lens of the first aspect, it is preferred that the side wall surfaces are modulated so that noise light attributed to diffraction does not spatially concentrate along a direction in the image plane.

According to the third aspect of the present invention, in the Fresnel lens of the second aspect, it is preferred that angles assumed by the side wall surfaces relative to an optical axis are modulated.

According to the fourth aspect of the present invention, in the Fresnel lens of the second aspect, it is preferred that positions of a side wall surface are modulated along a radial direction while the side wall surface sustains a constant angle relative to an optical axis regardless of the positions thereof assumed along a circumferential direction.

According to the fifth aspect of the present invention, in the Fresnel lens of the second aspect, it is preferred that an angle assumed by the side wall surface relative to an optical axis is periodically modulated in correspondence to positions thereof assumed along a circumferential direction.

According to the sixth aspect of the present invention, in the Fresnel lens of the second aspect, it is preferred that positions of a side wall surface are periodically modulated along the radial direction in correspondence to the positions thereof assumed along the circumferential direction.

According to the seventh aspect of the present invention, in the Fresnel lens of any one of the first through sixth aspects, it is preferred that the optical system is a human eye, and the image plane is a retina, and wherein the Fresnel lens is on at least one side of an eye glass lens to be set for the eye, and the Fresnel lens includes a plurality of zone lens surfaces disposed concentrically and a plurality of side wall surfaces each formed between adjacent zone lens surfaces and side wall surface modulation is optimized so that noise light due to reflection and/or refraction at the sidewalls is minimized in the image plane for various eye gaze angles.

According to the eighth aspect of the present invention, in the Fresnel lens of the seventh aspect, it is preferred that the side wall surfaces modulation is adjusted so as noise light attributed to diffraction does not spatially concentrate on the retina after passing through the iris of the eye.

According to the ninth aspect of the present invention, an optical device, comprising: an imaging lens for forming an image on an image plane; an aperture that restricts light passing through the imaging lens; and a Fresnel lens, wherein: the Fresnel lens includes a plurality of zone lens surfaces disposed concentrically and a plurality of side wall surfaces each formed between adjacent zone lens surfaces and that side walls modulation is optimized so that noise light due to reflection and/or refraction at the side walls is minimized in the image plane.

According to the tenth aspect of the present invention, in the optical device of the ninth aspect, it is preferred that the side wall surface modulation is optimized so that the noise light due to reflection and/or refraction at the sidewalls does not pass through the aperture.

According to the eleventh aspect of the present invention, in the optical device of the ninth aspect, it is preferred that the side wall surfaces modulation is adjusted so as noise light attributed to diffraction does not spatially concentrate on the imaging plane after passing through the aperture.

BRIEF DESCRIPTION OF THE DRAWINGS

FIG. 1A and FIG. 1B respectively show the Fresnel lens achieved in an embodiment of the present invention in a top view and in a sectional view, with an enlarged view of FIG. 1B presented in FIG. 1C.

FIG. 3A and FIG. 3B respectively show the Fresnel lens achieved in variation 1 in a top view and in a sectional view, and FIG. 3C is an enlargement of FIG. 3B.

FIG. 4A and FIG. 4B respectively show the Fresnel lens achieved in variation 2 in a sectional view.

DESCRIPTION OF EMBODIMENTS

Figure 6:
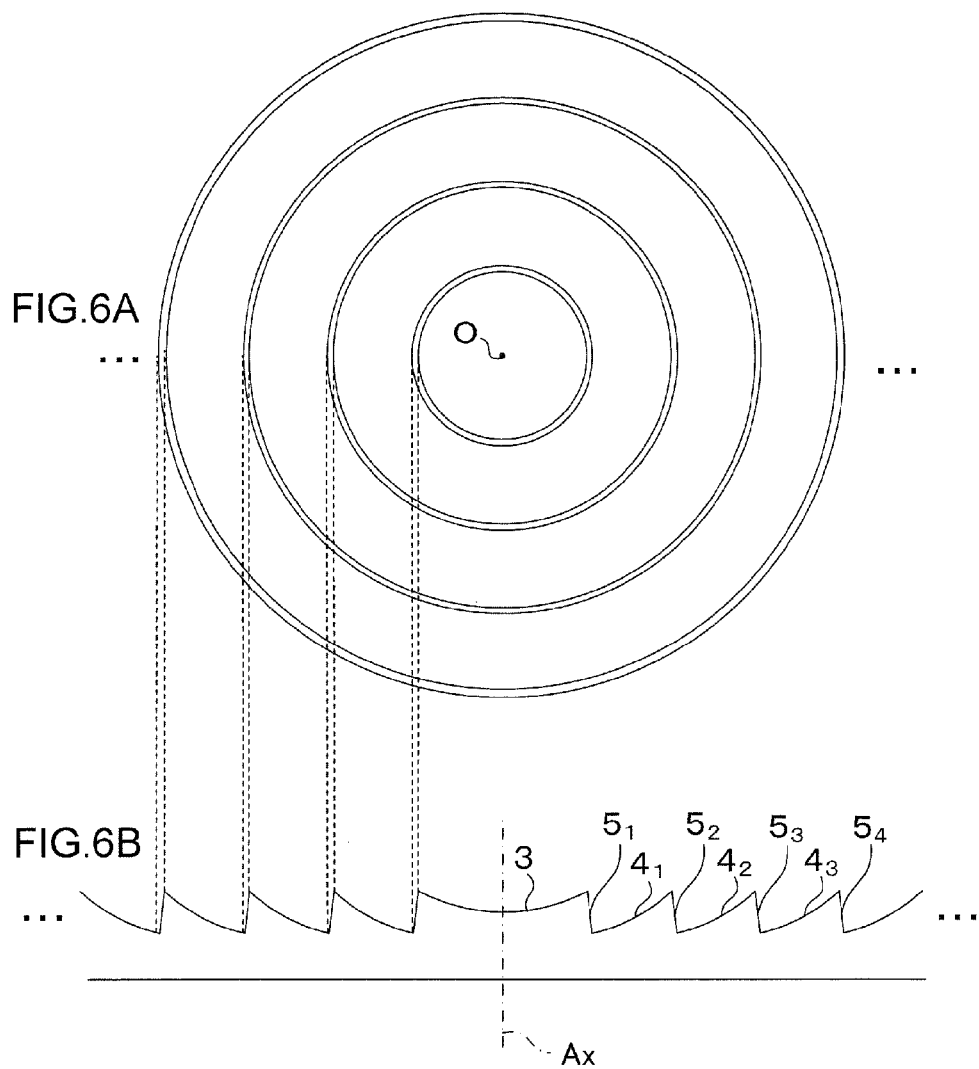
FIG. 6A and FIG. 6B respectively show a Fresnel lens in the related art in a top view and in a sectional view.

The following is a description of an embodiment of the present invention given in reference to drawings. The refractive Fresnel lens achieved in the embodiment, which is a lens having a Fresnel lens surface formed on a concave surface of, for instance, a meniscus lens, located toward the eye, and achieving either positive or negative refractive power, is used as an eyeglass lens or an imaging lens. Before describing the Fresnel lens in the embodiment in specific detail, a problem arising when a Fresnel lens in the related art is used as an eyeglass lens will be explained. FIGS. 6A and 6B respectively present a schematic top view and a schematic sectional view of an example of the related art, i.e., a Fresnel lens 1. It is to be noted that FIGS. 6A and 6B show part of the Fresnel lens 1. The Fresnel lens 1, adopting a structure achieved by disposing on a flat plane separate concentric parts that form the lens surface of a concave lens, includes a plano-concave central lens 3 with an optical axis Ax passing through the center O thereof and a plurality of zone lenses 4 ($4_1, 4_2, 4_3, \ldots, 4_n$) disposed further outside of the central lens 3 and concentrically relative to the optical axis Ax. A plurality of side walls 5 ($5_1, 5_2, 5_3, \ldots, 5_n$), are formed between the central lens 3 and a zone lens 4 and between adjacent zone lenses 4 so as to connect the central lens 3 and the zone lens 4 and connect one zone lens 4 with the next zone lens 4. It is to be noted that the Fresnel lens 1 may be manufactured by injection-molding of a polymer material in a die. In order to ensure that the molded product can be easily disengaged from the die, the side walls 5 are made to incline with a predetermined angle relative to the optical axis Ax.

Figure 7:
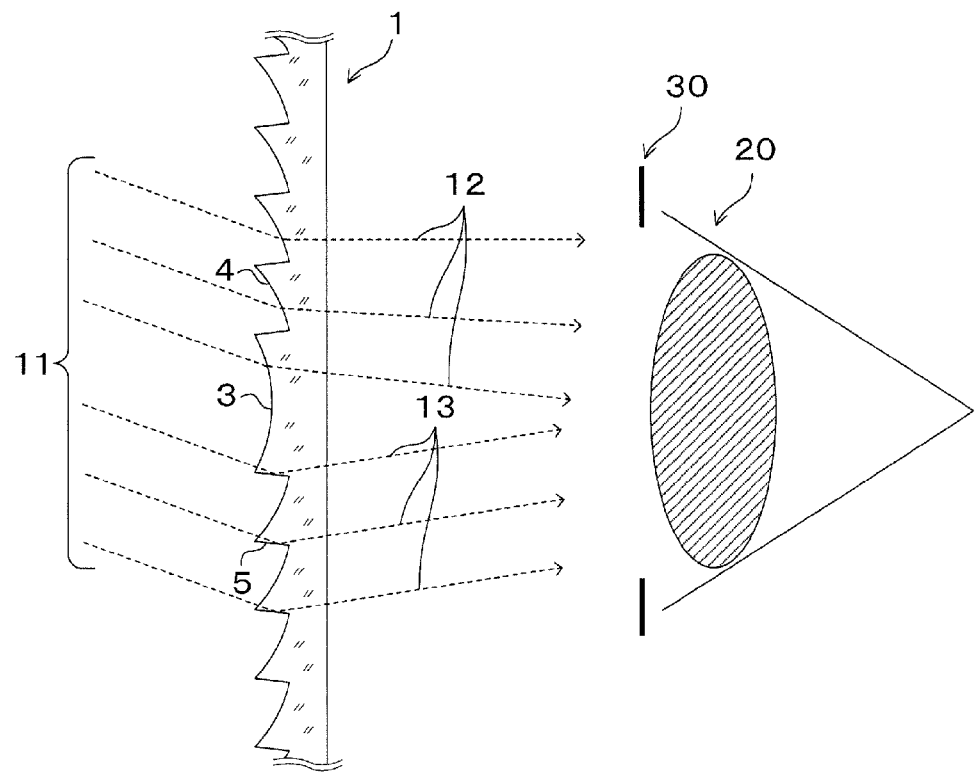
FIG. 7 schematically illustrates the optical paths formed in conjunction with the Fresnel lens used as an eyeglass lens.

FIG. 7 schematically illustrates the optical paths of light traveling through the Fresnel lens 1 used as an eyeglass lens. As shown in FIG. 7, incoming light 11 having entered the Fresnel lens 1 is refracted at the central lens 3 or the zone lenses 4 and is output as regular outgoing light 12, which then enters an eye 20 of the eyeglass wearer. However, some of the incoming light 11 is reflected at the side walls 5 and outgoes the Fresnel lens 1 as noise light 13. Depending upon the angle at which the noise light 13 outgoes the Fresnel lens 1, the noise light 13 may enter the eye 20 of the eyeglass wearer through an iris 30 of the eye 20. It is to be noted that FIG. 7, showing the Fresnel lens surface located on the object side of the meniscus lens and the eye-side surface taking on a flat contour, provides a simple illustration of the conditions of various light beams including the initial light transmitted through the Fresnel lens surface and the noise light occurring at the side wall surfaces 5 in a typical example. As an alternative to this example, the Fresnel lens surface may be formed at the concave surface located toward the eye, as will be explained later in reference to FIG. 5.

Figure 8:
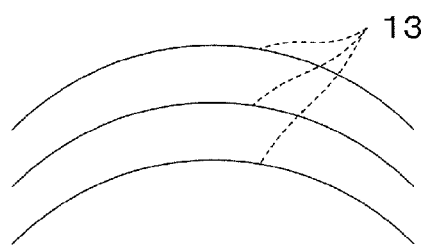
FIG. 8 schematically illustrates the distribution of regular output light and noise light reaching the retina through iris of an eye, observed when the Fresnel lens is used as an eyeglass lens.

FIG. 8 schematically illustrates the distribution of the regular outgoing light 12 and the noise light 13 reaching the retina through the iris 30 of the eye 20. In the example presented in FIG. 8, light output from a point light source enters the Fresnel lens 1. In this situation, an image of the point light source is formed on the retina with the regular outgoing light 12. The noise light 13, having reached the retina, on the other hand, forms circular arcs corresponding to the contour of the side walls 5. As a result, the eyeglass wearer is bound to see the noise light 13 as circular arc lines in addition to the image of the point light source formed with the regular outgoing light 12.

As long as the angle of incidence at which the light 11 enters the Fresnel lens 1 is constant, the entry of the noise light 13 into the iris 30 of the eye 20 of the eyeglass wearer can be prevented by adjusting the angle formed by the side walls 5 relative to the optical axis Ax (hereafter may be referred to as an angle of inclination) and thus adjusting the outgoing angle at which the noise light 13 outgoes the Fresnel lens 1. However, under normal circumstances, eye glasses are worn in an environment where the incoming light 11 enters the eyeglass lenses (the Fresnel lens 1 in this example) at varying angles. Also, eyeball can rotate at wide gaze angles. This means that the angle of inclination of the side walls 5, adjusted to the optimal value at which noise light 13 is not allowed to enter the eye 20 at all in correspondence to a given angle of incidence, may actually result in more noise light 13 entering the eye 20 at either another angle of incidence or a different eye gaze angle. In other words, it is extremely difficult to adjust the angle of inclination of the side walls 5 so as to completely disallow entry of all the noise light 13 into the eye 20 of the eyeglass wearer.

Bearing this challenge in mind, the Fresnel lens in the embodiment adopts a specific structure that renders noise light reflected at the side walls less noticeable. The following is a description of the Fresnel lens achieved in the embodiment. FIG. 1A and FIG. 1B schematically illustrate a Fresnel lens 100 achieved in the embodiment respectively in a top view and in a sectional view, with part of FIG. 1B shown in an enlargement in FIG. 1C. It is to be noted that FIGS. 1A, 1B and 1C only show part of the Fresnel lens 100. As is the Fresnel lens 1 in the related art described earlier, a Fresnel lens 100 achieved in the embodiment is a concave lens, the lens surface of which is formed with separate lens elements disposed concentrically over a flat plane. As does the Fresnel lens 1, it includes a plano-concave central lens 103 with an optical axis Ax passing through the center O thereof and a plurality of zone lenses (zone lens surfaces) 104 ($104_1, 104_2, 104_3, \ldots, 104_n$) disposed further outside relative to the central lens 103 and concentrically to the optical axis Ax. A plurality of side walls (side wall surfaces) 105 ($105_1, 105_2, 105_3, \ldots, 105_n$), are formed between the central lens 103 and a zone lens 104 and between adjacent zone lenses 104 so as to connect the central lens 103 and the zone lens 104 and connect one zone lens 104 with the next zone lens 104.

However, the Fresnel lens 100 in the embodiment differs from the Fresnel lens 1 in the related art in that, viewed from above (viewed along the direction in which the optical axis Ax extends), a top portion 105t of each side wall surface 105 has a wavy circular contour achieved by periodically modulating a circle centered on the optical axis Ax, as illustrated in FIG. 1A. At a bottom portion 105b thereof, a perfectly circular contour centered on the optical axis Ax is achieved as in the related art. It is to be noted that the description is provided by assuming that the top portion 105t, present in the area where a zone lens 104 merges with a side wall surface 105, is located on the side further away from a surface 106 of the Fresnel lens 100, at which the zone lenses 104 and the side wall surfaces 105 are not formed (hereafter referred to as a back surface 106) and that the bottom portion 105b is located on the side closer to the back surface 106.

This wavy circular contour formed at the top portion 105t is achieved by periodically altering the angle of inclination θ of the side wall surface 105 at specific positions taken along the circumferential direction, instead of allowing the side wall surface 105 to sustain a constant angle of inclination through the entire circumference. In more specific terms, the angle of inclination θ of the side wall surface 105 at a given position P may be expressed as in (1) below. It is to be noted that α, β, γ and f in expression (1) respectively represent a reference angle of inclination, an angular amplitude relative to the reference angle of inclination, the initial phase and the number of cycles (frequency) occurring within the full circumference. It is assumed that α, β, γ and f each take a constant value for a sidewall in the embodiment. In addition, ϕ in expression (1) represents the argument (the angle formed by a half line OP starting from an end point assumed at the origin point O and passing through the position P) relative to a polar axis OX measured for the position P indicated by coordinates in a polar coordinate system, the origin point of which is set at the center O.

$$\theta(\phi)=\alpha+\beta\times\frac{1}{2}(1-\cos(f\times\phi+\gamma)) \quad (1)$$

Namely, the angle of inclination θ of the side wall surface 105, is modulated with a cosine function that takes the argument ϕ as a variable so that the change thereof is comprised between the reference angle of inclination α and α+β. FIG. 1C provides a schematic illustration showing how the side wall surface 105 may be modulated. The side wall surface 105 is adjusted, in correspondence to its position along the circumferential direction, within the range between the side wall surfaces 105 indicated with the solid line in FIG. 1C and the side wall surface 105 indicated with the dotted line in FIG. 1C. In addition, the Fresnel lens 100 is configured by splitting the lens surface of a concave lens in a concentric pattern and disposing the split portions on a flat plate, as has been described earlier. While the angle of inclination of the side wall surfaces 105 is modulated in the Fresnel lens 100, the zone lens surfaces 104 retain the contours forming that part of the lens surface of the concave lens (i.e., the initial concave lens).

It is to be noted that the Fresnel lens 100 achieving such a contour or a die to be used to manufacture the Fresnel lens 100 may be formed through, for instance, lathing.

Figure 9:
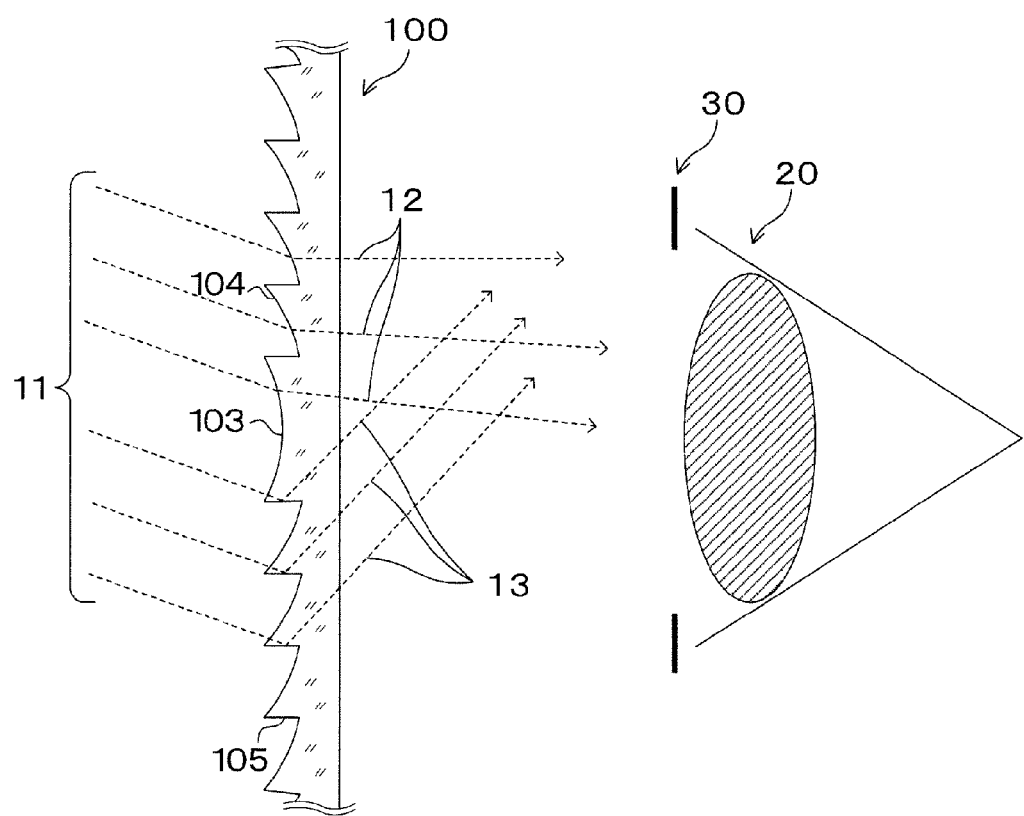
FIG. 9 schematically illustrates the optical paths formed in conjunction with the Fresnel lens in the embodiment of the present invention used as an eyeglass lens.

FIG. 9 schematically illustrates the optical paths that are formed when the Fresnel lens 100 in the embodiment is used as an eyeglass lens. As shown in FIG. 9, initial light fluxes (regular exiting light) 12 having been transmitted through the zone lens surfaces 104 of the Fresnel lens 100 then pass through the iris 30 and form an image on the retina of the eye 20. The side wall surfaces 105 of the Fresnel lens 100 are modulated so that the noise light 13 due to reflection and/or refraction at the side wall surfaces 105 is directed to travel outside of the eye iris (pupil) 30. In other words, the side wall surfaces 105 are modulated and optimized so that the noise light 13 occurring at the side wall surfaces 105 do not reach the eye or are blocked by the eye iris 30. This means that the noise light 13 is rarely allowed to reach the retina of the eye 20 and thus, the adverse effect of noise light reaching the image formed on the retina of the eye 20 is greatly reduced.

Figure 2A:
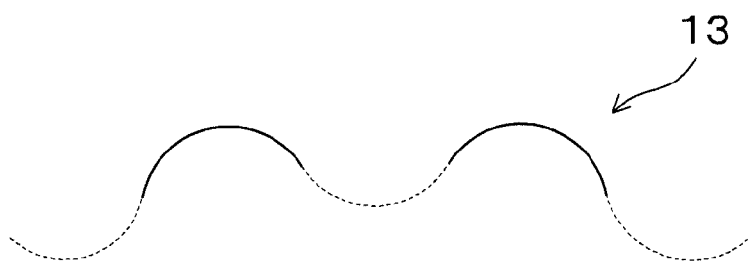
FIG. 2A and FIG. 2B schematically illustrate the distribution of noise light reaching the retina through the iris of an eye, observed when the Fresnel lens in the embodiment of the present invention is used as an eyeglass lens.
Figure 2B:
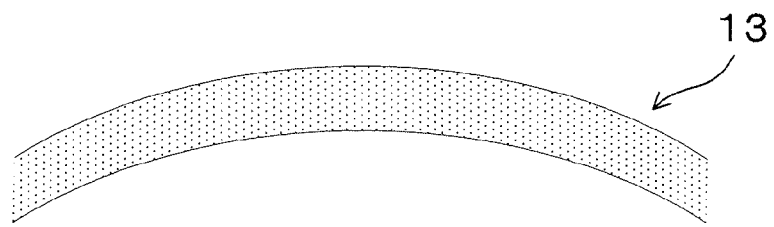

FIG. 2A and FIG. 2B schematically illustrate the distribution of noise light 13 that is reflected at a side wall surface 105 and then reaches the retina through the iris of an eye of an eyeglass wearer observed when the Fresnel lens 100 in the embodiment is used as an eyeglass lens. It is to be noted that FIG. 2A and FIG. 2B only show noise light reflected and/or refracted at a single side wall surface 105 so as to simplify the illustration. In FIG. 2A, the solid lines indicate noise light 13 having entered the eyes and the dotted lines indicate noise light that has not entered the eye. In addition, the angular amplitude β and the frequency f of the periodical modulation applied to achieve the wavy circular contour at the top portion 105t of the side wall surface 105 in the example presented in FIG. 2A are different from the angular amplitude β and the frequency f of the periodical modulation applied to achieve the wavy circular contour at the top portion 105t of the side wall surface 105 in the example presented in FIG. 2B. Namely, a greater angular amplitude β of periodical modulation is assumed at the side wall surface 105 in FIG. 2A compared to that in FIG. 2B. In addition, a higher frequency f of periodical modulation is assumed at the side wall surface 105 in FIG. 2B compared to that in FIG. 2A. According to the ray tracing simulation software developed by us, we confirmed the simulated noise light distribution on the retina shown in FIG. 2A or FIG. 2B is well consistent with the simulation result.

In the example presented in FIG. 2A, with a greater angular amplitude β of periodical modulation assumed at the side wall surface 105, the angle of inclination θ changes greatly and thus the outgoing angle at which the noise light 13 outgoes the Fresnel lens also changes greatly through the full circumference of the side wall surface 105. As a result, noise light 13 reflected at some positions does not enter the eye of the eyeglass wearer. Thus, while the noise light 13 reflected at side walls 5 of the Fresnel lens 1 in the related art forms continuous circular arc lines simulating the contour of the side walls 5 as shown in FIG. 8, the noise light 13 forms a disjoined contour, i.e., the wavy circular contour of the side wall surface 105 is reproduced with missing portions, in the example presented in FIG. 2A. Namely, while the part of the noise light 13 indicated by the solid lines in FIG. 2A, which is allowed to enter the eye, is visible to the eyeglass wearer, the part of the noise light 13 indicated by the dotted lines in FIG. 2A does not enter the eye due to the modulation effect and thus remains invisible to the eyeglass wearer. This means that the noise light 13 can be rendered less noticeable to the eyeglass wearer in the example presented in FIG. 2A compared to the related art.

In addition, in the example presented in FIG. 2B, with a higher frequency f of periodical modulation assumed at the side wall surface 105, a change occurs over a greater number of cycles through the full circumference of the side wall surface 105, causing scattering of the noise light 13. Thus, while the noise light 13 concentrates in a circular arc pattern resembling the contour of the side walls 5 at the Fresnel lens 1 in the related art, as indicated in FIG. 8, the noise light 13 spreads in a band in the example presented in FIG. 2B. This means that the brightness per unit area of the noise light 13 having reached the retina is lower compared to that in the related art, thereby rendering the noise light 13 less noticeable to the eyeglass wearer.

The noise light 13 occurring as light is reflected at the side wall surfaces 105 of the Fresnel lens 100 achieved in the embodiment is thus rendered less noticeable compared to noise light occurring at the Fresnel lens 1 in the related art.

In addition, the contour of the side wall surfaces 105 (the outline of the zone lens surfaces 104) are less noticeable to a third party looking at the wearer of the eyeglasses with the Fresnel lenses 100 in the embodiment compared to the contour of the side walls in the Fresnel lens 1 in the related art. Thus, the appearance of the eyeglass wearer viewed by a third party is likely to improve.

It is to be noted that a plurality of side wall surfaces 105, formed at positions closer to the center O through positions closer to the outer circumference of the Fresnel lens 100 in the embodiment, may all assume the wavy circular contour or only some of the side wall surfaces 105 may assume the wavy circular contour. In addition, the reference angle of inclination α, the angular amplitude β, the phase γ and the frequency f of periodical modulation applied to achieve the wavy circular contour may vary from one side wall surface 105 to another or matching reference angle of inclination α, angular amplitude β and frequency f of periodical modulation may be assumed for all the side wall surfaces 105.

The following advantage is achieved through the embodiment described above. In the Fresnel lens 100 that includes a plurality of zone lens surfaces 104 set in a concentric pattern and a plurality of side wall surfaces 105 each formed between one zone lens surface 104 and the next zone lens surface 104, the side wall surfaces 105 modulation is optimized so that noise light occurring at the side wall surfaces 105 is directed to travel outside an optical system or be blocked by apertures. Through these measures, noise light, attributable to light reflected and/or refracted at the side wall surfaces 105, entering the retina through the iris of the eye can be rendered less noticeable.

(Variation 1)

In the embodiment described above, the side wall surfaces 105, viewed from above, each assume a perfectly circular contour centered on the optical axis Ax at the bottom portion 105b thereof and assume a wavy circular contour, which is achieved by periodically modulating a circle centered on the optical axis Ax at the top portion 105t thereof. As an alternative, a side wall surface 105, viewed from above, may assume a perfectly circular contour centered on the optical axis Ax at its top portion 105t and assume a wavy circular contour, which is achieved by periodically modulating a circle centered on the optical axis Ax, at the bottom portion 105b.

As a further alternative, a side wall surface 105, viewed from above, may assume a wavy circular contour achieved by periodically modulating a circle centered on the optical axis Ax, both at the top portion 105t and the bottom portion 105b thereof. An example of a structure that may be adopted for such a Fresnel lens 200 is schematically illustrated in a top view and a sectional view provided respectively in FIG. 3A and FIG. 3B. In addition, a partial enlargement of FIG. 3B is provided in FIG. 3C.

The distance (radius) rt between a given position Pt taken at the top portion 105t of a side wall surface 105 and the center O of the Fresnel lens 200 may be expressed as in (2) below. In addition, the distance (radius) rb between a given position Pb taken at the bottom portion 105b of a side wall surface 105 and the center O may be expressed as in (3) below. It is to be noted that in expressions (2) and (3), Ct and Cb respectively represent the reference radii measured at the top portion 105t and at the bottom portion 105b, At and Ab respectively represent the radius amplitudes relative to the reference radii at the top portion 105t and the bottom portion 105b, γ and f represents respectively the initial phase and the number of cycles (frequency) occurring through the full circumference. In addition, φ in expressions (2) and (3) represents the argument (the angle formed by a half line OP starting from an end point assumed at the origin point O and passing through the position Pt or the position Pb) relative to the polar axis OX measured for the position Pt or Pb indicated by coordinates in a polar coordinate system, the origin point of which is set at the center O.

$$rt(\phi) = Ct + At \times \frac{1}{2}[1 - \cos(f \times \phi + \gamma)] \quad (2)$$

$$rb(\phi) = Cb + Ab \times \frac{1}{2}[1 - \cos(f \times \phi + \gamma)] \quad (3)$$

Namely, the radii rt and rb at the top portion 105t and the bottom portion 105b of the side wall surface 105 are modulated with a cosine function that includes the argument φ as a variable so that the changes in the radii are limited by the reference radii Ct and Cb respectively.

In addition, while the amplitude, the cycle and the phase of the periodical modulation applied so as to achieve the wavy contour at the top portion 105t of the side wall surface 105 match those of the periodical modulation applied to achieve the wavy contour at the bottom portion 105b and thus, the side wall surface 105 sustains a constant angle of inclination θ through the entire circumference in the Fresnel lens 200 shown in FIGS. 3A and 3B. In addition, the position of the side wall surface 105 is periodically modulated along the radial direction in correspondence to its position along the circumferential direction. FIG. 3C schematically illustrates how such modulation may be achieved. In correspondence to its position along the circumferential direction, the side wall surface 105 undergoes a parallel translation along the zone lens surface 104 within the range between the side wall surface 105 indicated with the solid line in FIG. 3C and the side wall surface 105 indicated with the dotted line in FIG. 3C. In the Fresnel lens 200 described above, the positions of the side wall surfaces 105 are modulated along the radial direction while the side wall surfaces 105 sustain a constant angle of inclination θ, regardless of their positions along the circumferential direction. In addition, as is the Fresnel lens 100 described earlier, the Fresnel lens 200 is configured by splitting the lens surface of a concave lens in a concentric pattern and disposing the split portions on a flat plate. While the side wall surfaces 105 are modulated in the Fresnel lens 200, the zone lens surfaces 104 retain the contours that form part of the lens surface of the concave lens (i.e., the initial concave lens).

However, the present invention is not limited to this example and the amplitude, the cycle and the phase of the periodical modulation applied to achieve the wavy contour at the top portion 105t may be different from those of the periodical modulation applied to achieve the wavy contour at the bottom portion 105b, i.e., the side wall surface 105 does not have to sustain a constant angle of inclination through its entire circumference.

It is to be noted that the Fresnel lens 200 achieving such a contour or a die to be used to manufacture the Fresnel lens 200 may be formed through, for instance, lathing. It has been shown, based upon optical calculation results, that a noise light dispersing effect is achieved in a Fresnel lens 200 with the height of the side wall surfaces 105 thereof set to an optimal value, even when the amplitude of the periodical modulation at the side wall surfaces 105 is as little as 10 µm.

It is to be noted that the plurality of side wall surfaces 105, formed at positions closer to the center O through positions closer to the outer circumference of the Fresnel lens 200 in variation 1, may all assume the wavy circular contour or only some of the side wall surfaces 105 may assume the wavy circular contour. In addition, the amplitudes At and Ab and the frequency f of the periodical modulations applied to achieve the wavy circular contour may vary from one side wall surface 105 to another or matching amplitude At and Ab and frequency f of periodical modulation may be assumed for all the side wall surfaces 105.

(Variation 2)

A side wall surface 105 with at least either the top portion 105t or the bottom portion 105b thereof assuming a wavy circular contour achieved by periodically modulating a circle centered on the optical axis Ax may incline with the angle of inclination θ that is continuously altered from the top portion 105t through the bottom portion 105b of the side wall surface 105, as illustrated in FIG. 4A or 4B. It is to be noted that FIG. 4A presents an example of a side wall surface 105 with the angle of inclination θ thereof, set at a smallest value at the top portion 105t, gradually increasing toward the bottom portion 105b, whereas FIG. 4B presents an example of the side wall surface 105 with the angle of inclination θ thereof periodically changing as it ranges from the top portion 105t thereof toward the bottom portion 105b.

By continuously altering the angle of inclination θ of the side wall surface 105 as it ranges from the top portion 105t thereof toward the bottom portion 105b thereof, as in these examples, noise light can be spread in wider bands, rendering the noise light even less noticeable to the eyeglass wearer.

It is to be noted that the Fresnel lens achieved in variation 2 having such a contour or a die to be used to manufacture the Fresnel lens in variation 2 may be formed through, for instance, lathing.

(Variation 3)

While the angular amplitude β and the frequency f of the periodical modulation applied at the side wall surface 105 in the embodiment described earlier are constant, the present invention is not limited to this example and instead, the modulation applied at the side wall surface 105 may be an amplitude modulation through which the angular amplitude β is continuously altered, a frequency modulation through which the frequency f is continuously altered or a modulation through which the angular amplitude β or the frequency f is randomly altered. However, a better throughput is assured when a Fresnel lens or a die used to manufacture a Fresnel lens is formed through lathing by selecting a uniform angular amplitude β in a uniform frequency f for the periodical modulation applied at the side wall surface 105. It is possible that noise attributable to light reflected and/or refracted at a side wall can be rendered less noticeable in case that the fluctuation of amplitude modulation is less than ±10% of local width of the zone lens surfaces or the frequency index modulation is less than 200%.

(Variation 4)

Figure 5:
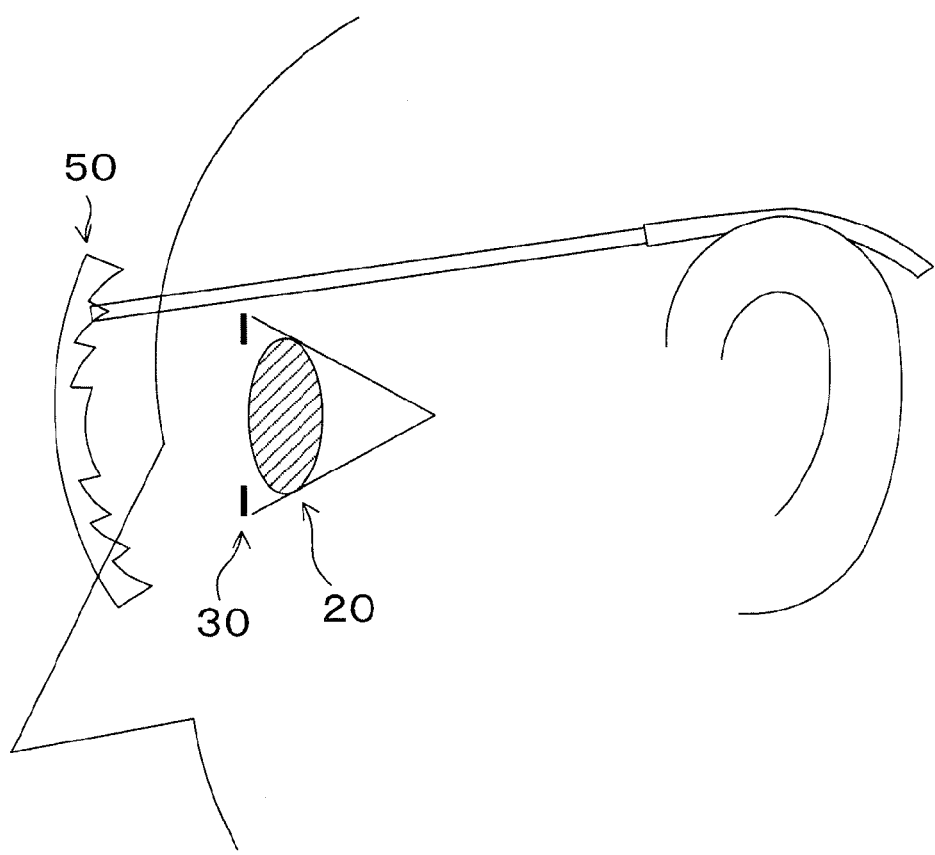
FIG. 5 schematically illustrates an eyeglass lens that includes the Fresnel lens achieved in the embodiment.

The Fresnel lens according to the present invention described above may be utilized as an eyeglass lens. FIG. 5 is a schematic illustration of an eyeglass lens 50 that includes the Fresnel lens according to the present invention. The eyeglass lens 50 is a meniscus lens with the Fresnel lens according to the present invention formed at the surface toward the eyeball. In this case, the surface carrying the Fresnel lens is not limited to a flat surface. It is available to adapt the Fresnel lens to a concave surface or a convex surface. The Fresnel lens can be in the front and/or back surface. Also, the zones lenses can have a concave or convex shape. It is to be noted that the Fresnel lens according to the present invention may be used in other optical devices (e.g., optical systems such as a magnifying glass or an eyepiece lens), instead of an eyeglass lens. For instance, the Fresnel lens 100 according to the present invention may be used in an optical device that includes a photographic lens and an aperture that restricts light passing through the photographic lens. In an optical device achieved in such an application, the eye 20 and the iris 30 shown in FIG. 5 will respectively correspond to the photographic lens and the aperture. The optical device achieved in an embodiment of the present invention will fulfill functions that will be described in reference to the light beams shown in FIG. 9. Namely, the initial light beams 12, having been transmitted through the zone lens surfaces 104 of the Fresnel lens 100, pass through the aperture (iris) 30 and form an image on the imaging surface (retina). The side wall surfaces 105 in the Fresnel lens 100 according to the present invention are modulated and optimized so that noise light 13 occurring at the side wall surfaces 105 does not pass through the aperture (iris) 30. This means that the noise light 13 occurring at the side wall surfaces of the Fresnel lens 100 is not allowed to pass through the aperture (iris) 30 and thus, the noise light 13 never reaches the imaging surface (retina) through the photographic lens (eye) 20. As a result, the adverse effect of noise light reaching the image formed on the imaging surface (retina) can be greatly reduced.

To describe this aspect of the Fresnel lens according to the present invention in further details, the side wall surfaces are modulated and optimized so that noise light due to reflection and/or refraction at the side wall surfaces 105 does not generally pass through the iris 30 (or the aperture in the optical device in variation 4). In addition, the side wall surfaces 105 are modulated so that noise light due to diffraction does not concentrate along a specific direction, i.e., onto the imaging surface (i.e., the retina or the imaging surface).

(Variation 5)

In the refractive Fresnel lens according to the present invention described above, diffracted light of a plurality of orders other than the 0th order light (±1st order light, ±2nd order light, . . . ,) emitted due to discontinuities between the zone lens surfaces 104, may become noise visible to the eyeglass wearer. Accordingly, the refractive Fresnel lens described earlier may be configured by taking further measures so as to minimize noise attributable to diffracted light. In more specific terms, since the intensity of the diffractive light increases if the zone lens surfaces 104 are set over equal intervals, the zone lens surfaces 104 should be set with irregular pitches so as to reduce the intensity of the diffracted light, level out the diffracted light intensity levels and thus lower the peak.

Figure 10:
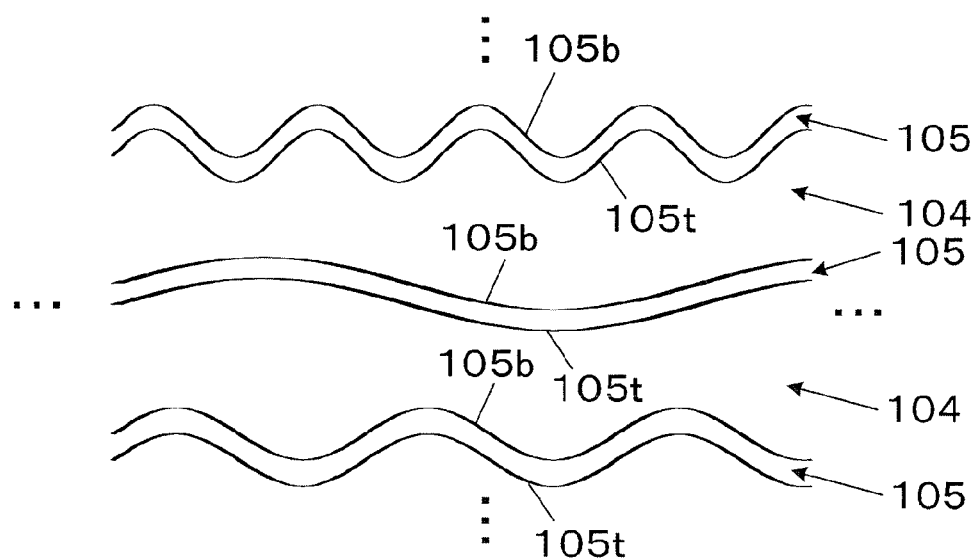
FIG. 10 illustrates the Fresnel lens achieved in variation 5 in an enlarged plan view.

FIG. 10 illustrates a Fresnel lens 300 configured so as to attenuate noise due to diffracted light. FIG. 10 shows the modulated side wall surfaces 105 as straight shape to facilitate an explanation in an enlargement of part of the top surface of the Fresnel lens 300. It is to be noted that except for the feature that will be described below, the Fresnel lens 300 is structurally similar to the Fresnel lens 200 described earlier in reference to variation 1. Based upon the results obtained through rigorous optical calculation, periodical modulation is applied with regard to the positions of the side wall surfaces 105 in the Fresnel lens 300 in the embodiment so that different initial phases are assumed from one side wall surface to another in order to ensure that the distance between adjacent side wall surfaces 105 facing each other across an optical surface are set non-constant. To describe this concept in terms of the functions of an optical grating, when all the grooves, not just consecutive grooves, are formed over uniform intervals and are parallel to each others, very dense diffracted light peaks (i.e., noise light) are formed. In order to lessen the extent of such diffraction effect, grooves can be formed at non uniform intervals and tilted from one each other. In the embodiment, it can be done by offsetting the initial phases of individual side walls sharing a given frequency or by modulating adjacent side wall surfaces at frequencies that do not share a common divisor (hereafter referred to as frequency represented by values coprime to each other), so as to disallow generation of diffracted light along a specific direction. It will be obvious that the initial phases may also be offset in conjunction with frequencies represented by values coprime to one another.

By modulating the individual side wall surfaces 105 with varying modulation frequencies, amplitudes or varying initial phases as described above, the zone lens surfaces 104 can be set with locally irregular shapes and, as a result, noise peaks attributable to diffracted light can be reduced. It is to be noted that in addition to the modulation frequency, at least either the amplitude or the phase may be varied from one side wall surface 105 to the next side wall surface 105.

Figure 11:
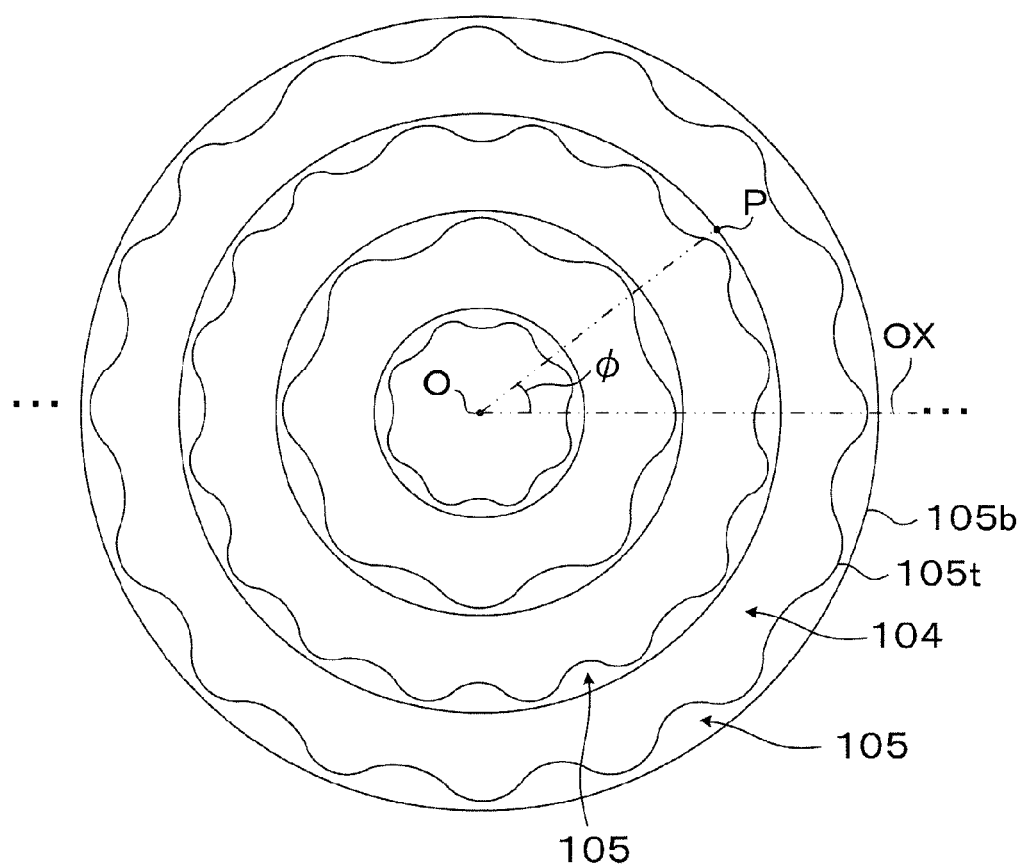
FIG. 11 is a plan view of another variation of the present invention.
Figure 12:
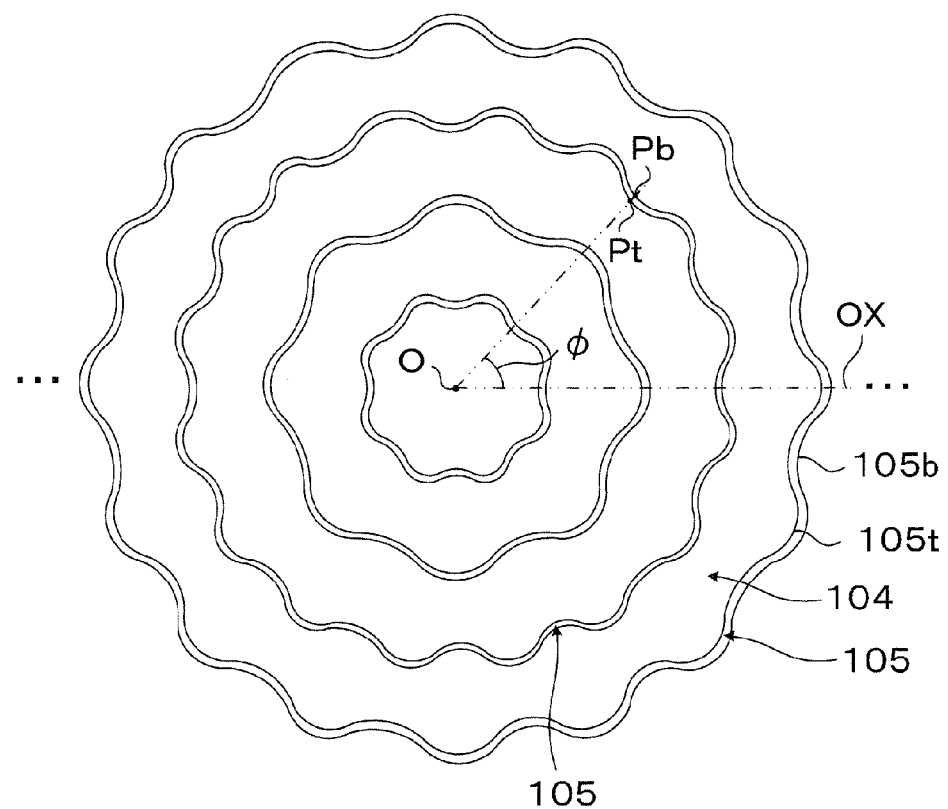
FIG. 12 is a plan view of yet another variation of the present invention.

FIG. 11 is a plan view of a Fresnel lens 400 achieved in another variation of the present invention. The plan view in FIG. 11 shows a Fresnel lens 400 having each pair of side wall surfaces 105 located on the two sides of a given zone lens surface 104 (i.e., located on the inner side and on the outer side) modulated with the same frequency f but having an initial phase difference of 180 deg. Otherwise, the Fresnel lens 400 assumes a basic structure corresponding to that of the Fresnel lens 100 shown in FIG. 1A. FIG. 12 is a plan view of a Fresnel lens 500 achieved in yet another variation of the present invention. While the initial modulation values pertaining to the modulation applied at the side wall surfaces 105 located on the two sides of each zone lens surface 104, (i.e., located on the inner side and on the outer side of the zone lens surface 104) are also out of phase by 180 deg in the Fresnel lens 500 shown in the plan view in FIG. 12, the basic structure of the Fresnel lens 500 corresponds to that of the Fresnel lens 200 shown in FIG. 3A.

The phase difference between adjacent side wall surfaces 105 is set to 180 deg in the variations shown in FIG. 11 and FIG. 12. This represents the maximum out of phase situation. In practical application, it is effective to have at least 30 deg initial phase difference between adjacent side wall surfaces 105.

In short when the area on the Fresnel lens, through which light flux for forming an image of a point object on the retina passes, includes plural zone lens surfaces, the frequency, the amplitude and relative phase of modulation on each side wall would be selected so that the local width of the zone lens surfaces 104 change by approximately 10%. Through these measures, noise due to diffracted light can be reduced even more effectively.

The embodiments described above and variations thereof are simply provided as examples and the present invention is in no way limited to the particulars of these examples. In addition, other modes of embodiment conceivable within the technical scope of the present invention are all within the scope of the present tension.

What is claimed is:

1. A Fresnel lens for use in an optical system including an image plane,
the Fresnel lens being constructed as a refractive optical element with respect to visible light, and comprising:
a plurality of annular zone lens surfaces disposed concentrically; and
a plurality of side wall surfaces each formed between adjacent annular zone lens surfaces, the side wall surfaces generating noise lights due to reflection and/or refraction of light incident at varying angles on the side wall surfaces,
wherein the side wall surfaces are modulated so as to spatially spread the noise lights in the image plane.

2. The Fresnel lens according to claim 1, wherein:
the side wall surfaces are modulated so that noise light attributed to diffraction does not spatially concentrate along a direction in the image plane.

3. The Fresnel lens according to claim 2, wherein:
an angle assumed by each said side wall surface relative to an optical axis is modulated in correspondence with position along a circumferential direction.

4. The Fresnel lens according to claim 2, wherein:
a position of each said side wall surface is modulated along a radial direction while maintaining a constant angle relative to an optical axis regardless of position along a circumferential direction.

5. The Fresnel lens according to claim 3, wherein:
the angle assumed by each said side wall surface relative to the optical axis is periodically modulated in correspondence with position along a circumferential direction, and
an inclination θ of each said side wall surface at a given position (P) is expressed by the following expression (1):

$$\theta(\phi)=\alpha'+\beta\times\tfrac{1}{2}[1-\cos(f\times\phi+\gamma)] \quad (1)$$

where α, β, γ and f respectively represent a reference angle of inclination, an angular amplitude relative to the reference angle of inclination, an initial phase and a number of change cycles (frequency) occurring within a full circumference, and φ represents an angle formed by a half line (OP) starting from an end point at an origin point (O) and passing through the position (P) relative to a polar axis (OX) in a polar coordinate system having the origin point (O) set at a center of the Fresnel lens.

6. The Fresnel lens according to claim 4, wherein:
the positions of each said side wall surface is periodically modulated along the radial direction, and
a distance (radius) rt between a given position (Pt) taken at a top portion of the side wall surface and a center of the Fresnel lens is expressed by the following expression (2), and a distance (radius) rb between a given position (Pb) taken at a bottom portion of the side wall surface and the center of the Fresnel lens is expressed by the following expression (3):

$$rt(\phi)=Ct+At\times\tfrac{1}{2}[1-\cos(f\times\phi+\gamma)] \quad (2)$$

$$rb(\phi)=Cb+Ab\times\tfrac{1}{2}[1-\cos(f\times\phi+\gamma)] \quad (3)$$

where Ct and Cb respectively represent reference radii of the top portion and the bottom portion, At and Ab respectively represent radius amplitudes relative to the reference radii at the top portion and the bottom portion, γ and f respectively represent an initial phase and a number of cycles (frequency) occurring through a full circumference, and φ represents an angle formed by a half line (OP) starting from an end point at an origin point (O) and passing through the position (Pt) or the position (Pb) relative to a polar axis (OX) in a polar coordinate system having the origin point (O) set at the center of the Fresnel lens.

7. The Fresnel lens according to claim 2, wherein:
each said side wall surface has a bottom portion in the form of circular contour centered on the optical axis and a top portion in the form of wavy circular counter constituted by a periodically modulated circle centered on the optical axis.

8. The Fresnel lens according to claim 2, wherein:
adjacent side wall surfaces are modulated by a same frequency and have different phases.

9. The Fresnel lens according to claim 8, wherein:
a phase difference between the adjacent side wall surfaces is at least 30 degrees.

10. The Fresnel lens according to claim 1, wherein:
the optical system is formed by an eyeglass lens with a human eye, the image plane is a retina of the human eye, the plurality of zone lens surfaces and the plurality of side wall surfaces include zone lens surfaces and side wall surfaces formed on at least one side of the eyeglass lens, and
side wall surface modulation is optimized so that the noise light due to reflection and/or refraction at the side wall surfaces is minimized at the retina for various eye gaze angles.

11. The Fresnel lens according to claim 10, wherein:
the side wall surfaces modulation is adjusted so that noise light attributed to diffraction does not spatially concentrate on the retina after passing through an iris of the human eye.

12. The Fresnel lens according to claim 1, configured as a meniscus lens.

13. The Fresnel lens according to claim 12, wherein the zone lens surfaces and side wall surfaces are disposed on a concave surface of the meniscus lens.

14. The Fresnel lens according to claim 1, wherein the zone lens surfaces and side wall surfaces are disposed on at least one of a concave lens surface and a convex lens surface.

15. An optical device, comprising:
an imaging lens for forming an image on an image plane;
an aperture that restricts light passing through the imaging lens; and
a Fresnel lens, wherein:
the Fresnel lens is constructed as a refractive optical element with respect to visible light, and includes a plurality of annular zone lens surfaces disposed concentrically and a plurality of side wall surfaces each formed between adjacent annular zone lens surfaces, the side wall surfaces generating noise lights due to reflection and/or refraction of light incident at varying angles on the side wall surfaces,
wherein the side wall surfaces are modulated, and the modulation is optimized so as to minimize the noise lights in the image plane.

16. The optical device according to claim 15, wherein:
the side wall surface modulation is optimized to substantially prevent the noise light from passing through the aperture.

17. The optical device according to claim 15, wherein:
the side wall surface modulation is adjusted so that noise light attributed to diffraction does not spatially concentrate on the image plane after passing through the aperture.

* * * * *